(12) United States Patent
Johnson et al.

(10) Patent No.: US 6,273,352 B1
(45) Date of Patent: *Aug. 14, 2001

(54) TAPE DRIVE SYSTEM WITH ENGAGEMENT CONTROL FEATURE

(75) Inventors: Michael W. Johnson, Cottage Grove, MN (US); David T. Hoge, Westminster, CO (US)

(73) Assignees: Imation Corp., St. Paul, MN (US); Storage Technology Corporation, Louisville, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/546,774

(22) Filed: Apr. 11, 2000

(51) Int. Cl.[7] ..................................... G11B 23/04
(52) U.S. Cl. .......................... 242/340; 242/348; 242/36; 360/85; 360/93; 360/132
(58) Field of Search ..................... 242/340, 342, 242/348, 611, 611.1, 356; 360/132, 85, 93

(56) References Cited

U.S. PATENT DOCUMENTS

| | | |
|---|---|---|
| 3,857,531 | 12/1974 | Jantzen . |
| 4,654,740 | 3/1987 | Katoku . |
| 4,775,115 | 10/1988 | Gelardi . |
| 5,366,173 | 11/1994 | Lammers et al. . |
| 5,564,647 | 10/1996 | Bay et al. . |

FOREIGN PATENT DOCUMENTS

| | | |
|---|---|---|
| 0284687 | 10/1988 | (GB) . |
| 2236092 | 3/1991 | (GB) . |

*Primary Examiner*—John Q. Nguyen
(74) *Attorney, Agent, or Firm*—Dicke, Billig & Czaja, P.A.

(57) ABSTRACT

A data storage tape drive system includes a data storage tape cartridge and a tape drive mechanism. The data storage tape cartridge includes a tape reel including a circular ring of teeth projecting in a direction generally parallel to an axis of rotation thereof and an engagement surface spaced radially from the circular ring of teeth. The tape drive mechanism includes a drive hub including a circular ring of teeth projecting in a direction generally parallel to an axis of rotation thereof and an engagement feature spaced radially from the circular ring of teeth of the drive hub. When the drive hub is operatively engaged with the tape reel, the teeth of the drive hub are engaged with the teeth of the tape reel and the engagement feature of the drive hub is engaged with the engagement surface of the tape reel so as to control operative engagement between the data storage tape cartridge and the tape drive mechanism.

18 Claims, 7 Drawing Sheets

TAPE DRIVE SYSTEM WITH ENGAGEMENT CONTROL FEATURE

BACKGROUND OF THE INVENTION

The present invention relates generally to a data storage tape drive system. More particularly, the present invention relates to an engagement control feature of a data storage tape cartridge and a tape drive mechanism when the data storage tape cartridge and the tape drive mechanisms are in operative engagement.

Data storage tape drive systems are commonly used in the computer, audio, and video fields to record and store large volumes of information for subsequent retrieval and use. A data storage tape drive system generally includes a data storage tape cartridge and a tape drive mechanism selectively engaged with the data storage tape cartridge. The data storage tape cartridge, for example, an industry standard 3480-type tape cartridge, generally includes a housing, a tape reel rotatably disposed within the housing, and a length of magnetic storage tape wound around a hub of the tape reel. The tape drive mechanism generally includes a drive hub configured to operatively engage the data storage tape cartridge and rotate the tape reel, and a drive motor for controlling the drive hub. The tape drive mechanism also includes transducers, such as a magnetic read/write head, for interacting with and recording data to, or reading data from, the storage tape.

Operative engagement between the data storage tape cartridge and the tape drive mechanism includes engagement of teeth formed on the drive hub with teeth formed on the tape reel. Imperfections in the teeth, however, may result in skewing and/or misalignment between the tape reel and the drive hub during operative engagement. Fortunately, for currently available tape drive systems, skewing and/or misalignment between the tape reel and the drive hub does not adversely affect positioning of the storage tape relative to the read/write head. With the 3480-type tape cartridge, for example, the storage tape is directed a relatively long distance from the housing to the read/write head. Thus, interaction between the read/write head and the storage tape takes place away from the housing and, therefore, away from the tape reel. Skewing and/or misalignment between the tape reel and the drive hub during operative engagement, therefore, is compensated by relatively ample tape length between the housing and the transducers. As such, additional tape guides may be provided to properly align the storage tape, thereby alleviating the effects of skewing and/or misalignment between the tape reel and the drive hub.

Unfortunately, new data storage tape drive systems no longer afford such generous spacing between the housing of the data storage tape cartridge and the transducers of the tape drive mechanism. Interaction between the transducers, for example, the read/write head, and the storage tape now occurs closer to the housing. Skewing and/or misalignment between the tape reel and the drive hub, therefore, results in degraded interaction between the transducers and the storage tape.

Accordingly, a need exists for a data storage tape drive system that accurately and consistently controls operative engagement between a tape reel of a data storage tape cartridge and a drive hub of a tape drive mechanism in an effort to avoid skewing and/or misalignment between the same.

SUMMARY OF THE INVENTION

One aspect of the present invention provides a tape reel of a data storage tape cartridge including a pair of spaced flanges and a hub extending between the spaced flanges. A circular ring of teeth are operatively associated with the spaced flanges and the hub to transmit rotational force thereto, and project in a direction generally parallel to an axis of rotation of the tape reel. An engagement surface is spaced radially from the circular ring of teeth and defines a datum plane of the tape reel.

Another aspect of the present invention provides a data storage tape cartridge including a housing, at least one tape reel rotatably disposed within the housing, and storage tape maintained by the tape reel. The tape reel includes a pair of spaced flanges and a hub extending between the spaced flanges. A circular ring of teeth are operatively associated with the spaced flanges and the hub to transmit rotational force thereto, and project in a direction generally parallel to an axis of rotation of the tape reel. An engagement surface is spaced radially from the circular ring of teeth and defines a datum plane of the tape reel.

Yet another aspect of the present invention provides a data storage tape drive system including a data storage tape cartridge and a tape drive mechanism selectively engaged with the data storage tape cartridge. The data storage tape cartridge includes a housing, a tape reel rotatably disposed within the housing, and storage tape maintained by the tape reel. The tape reel includes a circular ring of teeth projecting in a direction generally parallel to an axis of rotation of the tape reel and an engagement surface spaced radially from the circular ring of teeth. The tape drive mechanism includes a drive hub having a circular ring of teeth projecting in a direction generally parallel to an axis of rotation of the drive hub and an engagement feature spaced radially from the circular ring of teeth of the drive hub. As such, the engagement feature of the drive hub is engaged with the engagement surface of the tape reel when the drive hub is operatively engaged with the tape reel to establish a datum plane of the tape reel relative to the drive hub.

Still yet another aspect of the present invention provides a method of operatively engaging a drive hub of a tape drive mechanism with a tape reel of a data storage tape cartridge. The method includes the steps of engaging a circular ring of teeth of the drive hub with a circular ring of teeth of the tape reel, contacting an engagement surface of the tape reel with an engagement feature of the drive hub, and preventing a tip of the teeth of the drive hub from contacting a base of the teeth of the tape reel by contact of the engagement surface with the engagement feature.

DESCRIPTION OF THE PREFERRED EMBODIMENTS

Figure 1:
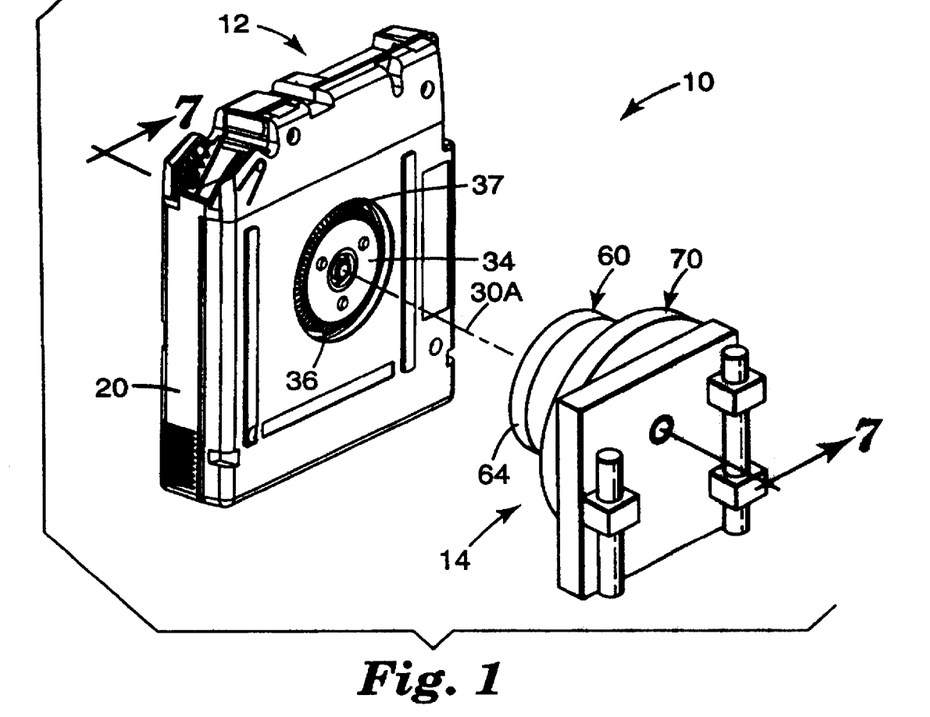
FIG. 1 is an exploded perspective view of a data storage tape cartridge and a tape drive mechanism according to the present invention prior to operative engagement.
Figure 2:
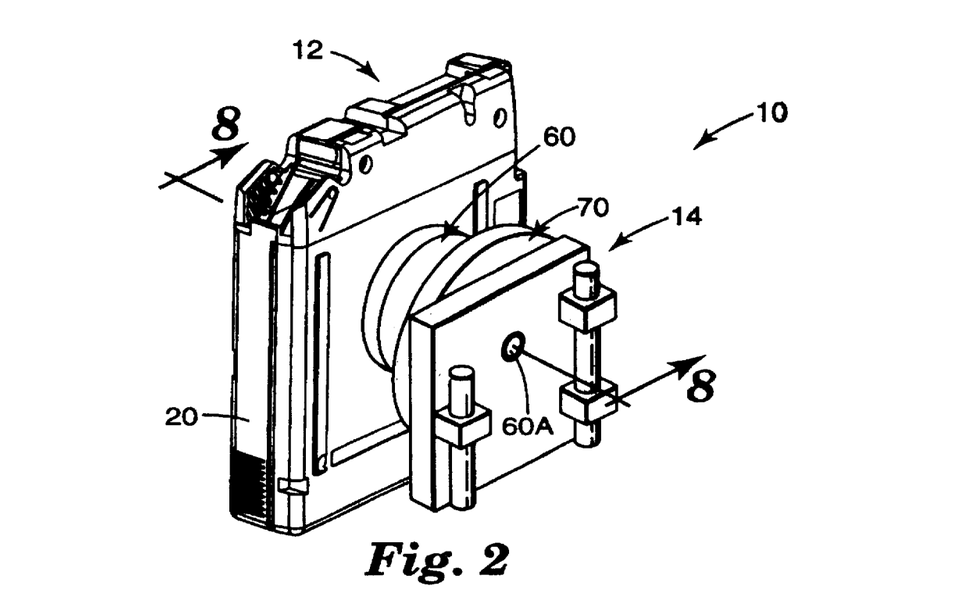
FIG. 2 is a perspective view of the data storage tape cartridge and the tape drive mechanism of FIG. 1 in operative engagement.

As shown in FIGS. 1 and 2, one preferred embodiment of a data storage tape drive system 10 generally includes a data storage tape cartridge 12 and a tape drive mechanism 14. A conventional elevator assembly (not shown) transfers the tape cartridge 12 into contact and operative engagement with the tape drive mechanism 14, as shown in FIG. 2. Thereafter, transducers (not shown) interact with storage tape 50 of the tape cartridge 12 to store information on and retrieve information from the storage tape 50.

Figure 3:
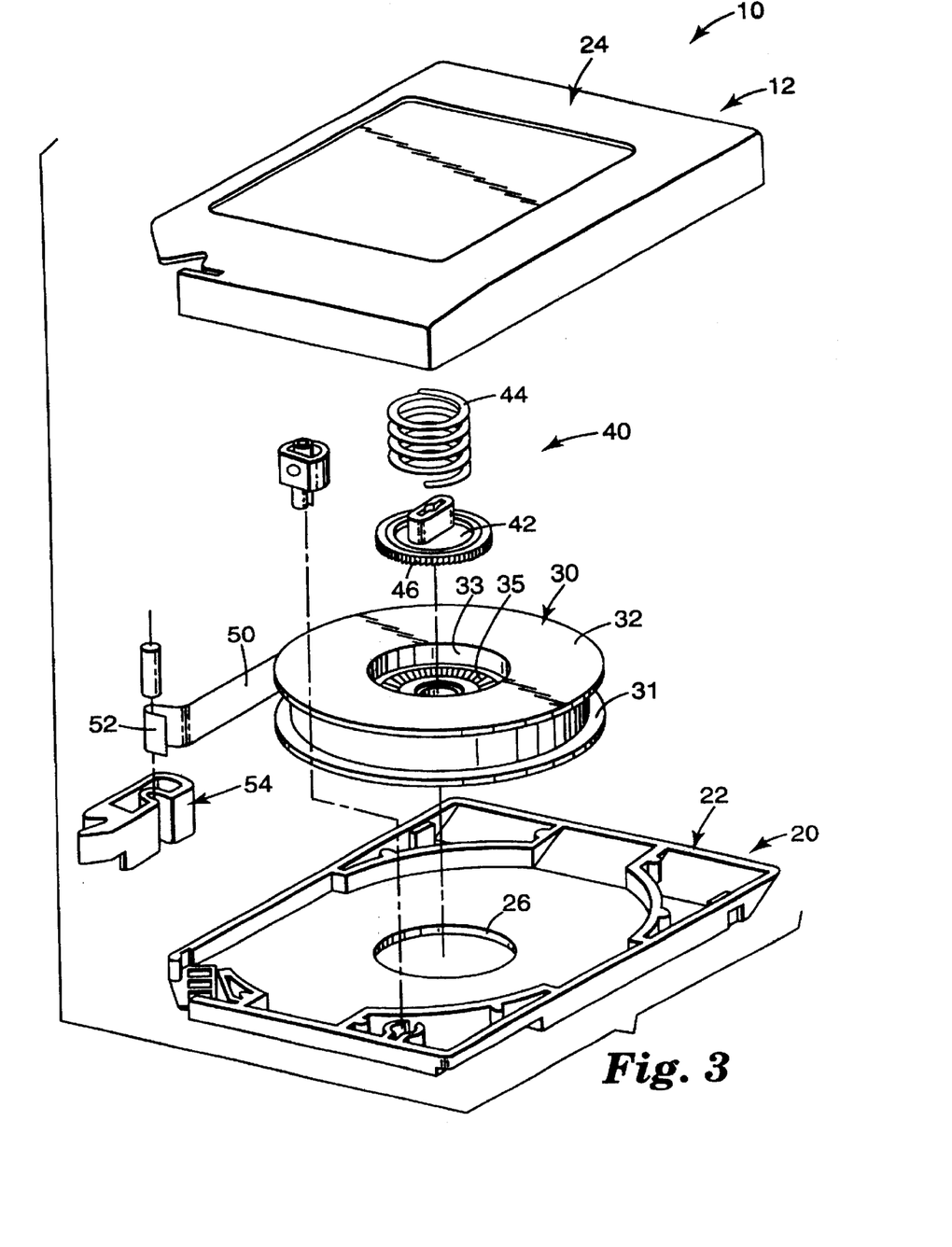
FIG. 3 is an exploded perspective view of a data storage tape cartridge according to the present invention.

As shown in FIG. 3, the data storage tape cartridge 12 generally includes a housing 20, a tape reel 30, a brake assembly 40, and storage tape 50. The housing 20 is formed by a base 22 and a cover 24 each configured to be reciprocally mated to one another. The base 22 has a central opening 26 therein which facilitates access to the tape reel 30 and the brake assembly 40 by the tape drive mechanism 14. The tape reel 30 is rotatably disposed within the housing 20 and the storage tape 50 is wound around a portion of the tape reel 30.

The brake assembly 40 includes a release button 42 slidably disposed on a tab 28 extending inwardly from the cover 24 (see FIGS. 7 and 8), and a spring 44 biasing the release button 42 into selective engagement with a portion of the tape reel 30. In an engaged position, the release button 42 prevents rotation of the tape reel 30. During use, however, the tape drive mechanism 14 (FIG. 1) directs the release button 42 away from the tape reel 30 so as to establish a disengaged position wherein the tape reel 30 is free to rotate (see FIG. 8). Alternatively, other configurations for the brake assembly 40, known in the art, are equally acceptable.

The storage tape 50 has a free end 52 which is attached to a leader block 54 by which the storage tape 50 is directed along a tape path within the tape drive mechanism 14 (FIG. 1). The storage tape 50 is preferably a magnetic tape of a type commonly known in the art. The storage tape 50, for example, can consist of a balanced polyethylene naphthalate (PEN) based material coated on one side with a layer of magnetic material dispersed within a suitable binder system, and on the other side with a conductive material dispersed within a suitable binder system. Acceptable magnetic tape is available, for example, from Imation Corp. of Oakdale, Minn.

Figure 4:
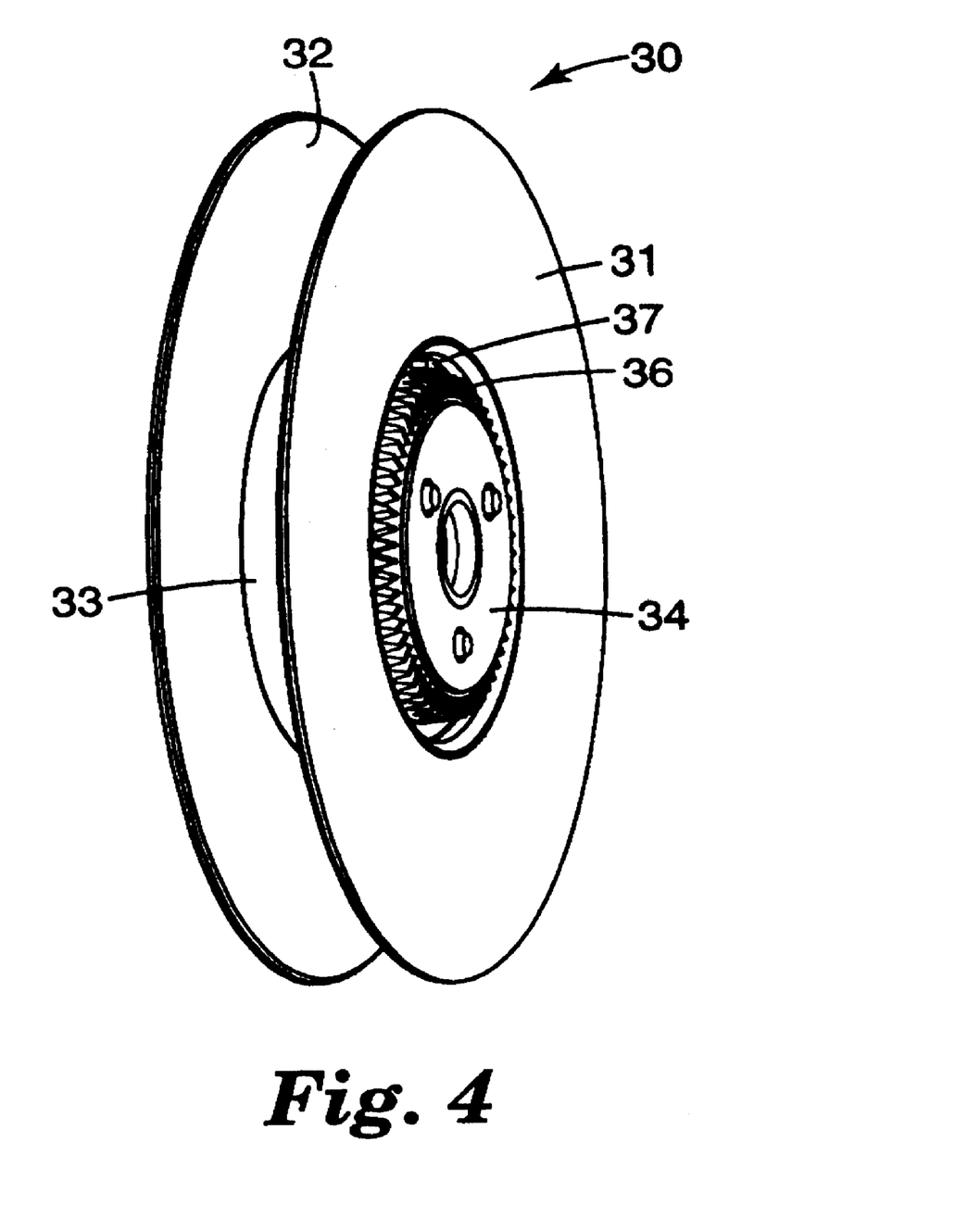
FIG. 4 is a perspective view of a tape reel of a data storage tape cartridge according to the present invention.

As shown in FIG. 4, the tape reel 30 has an axis of rotation 30A, and includes a pair of axially spaced flanges 31, 32 and a hub 33 extending between the flanges 31, 32. The tape reel 30 also includes a circular ring of teeth 36 projecting from the hub 33 in a direction generally parallel to the axis of rotation 30A, and a plurality of projections 37 spaced radially from the circular ring of teeth 36.

Figure 5:
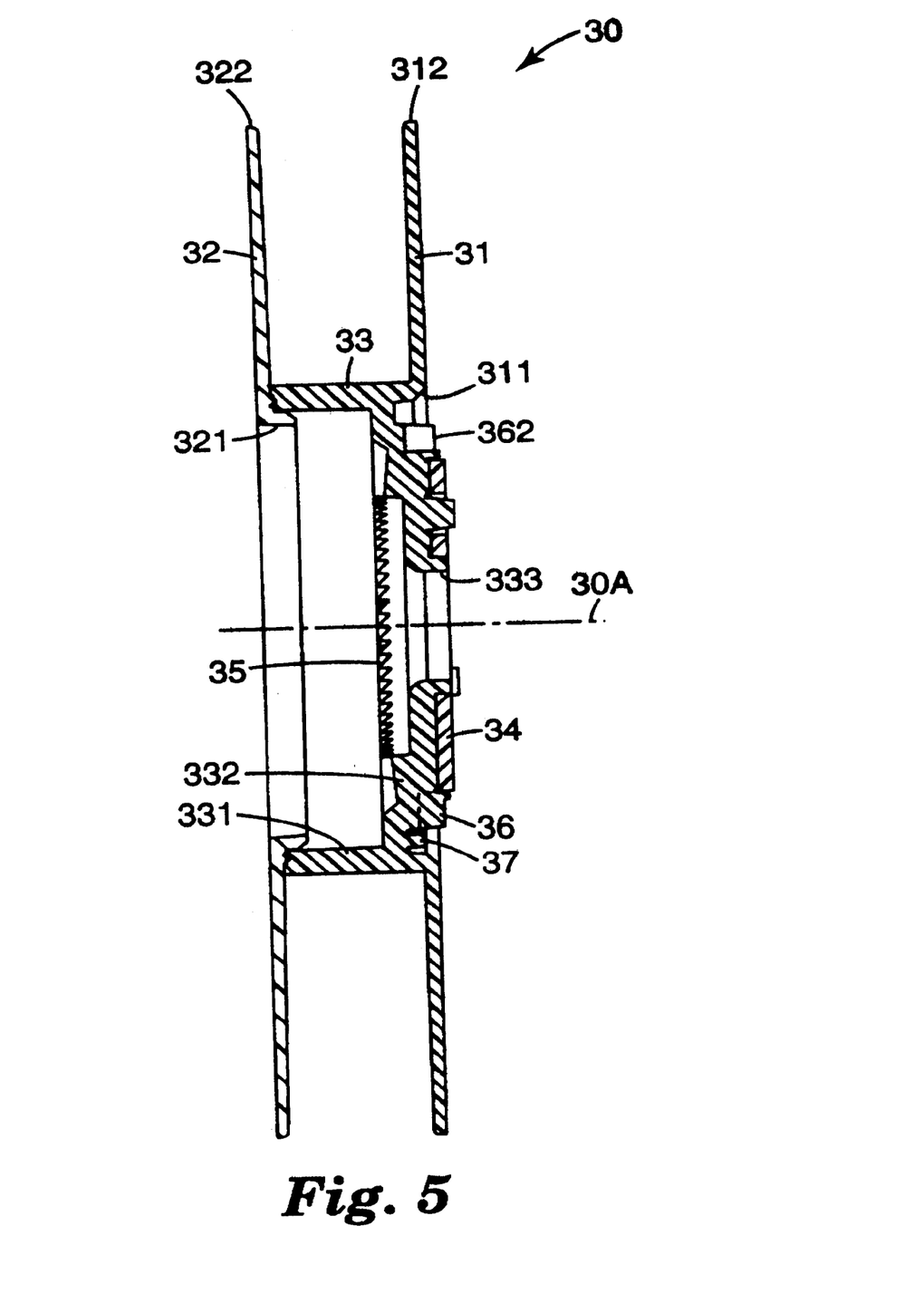
FIG. 5 is a cross-sectional view of the tape reel of FIG. 4.

As shown in FIG. 5, the flanges 31, 32 are oriented generally parallel to each other and generally perpendicular to the axis of rotation 30A. Each of the flanges 31, 32 are annular in shape and have an inner edge 311, 321, respectively, and an outer edge 312, 322, respectively. The inner edge 311, 321, respectively, and the outer edge 312, 322, respectively, define an inner diameter and an outer diameter of each of the flanges 31, 32, respectively. In one preferred embodiment, the inner edge 311 of the flange 31 is beveled.

The hub 33 includes a first portion 331 extending between the flanges 31, 32 in a direction generally parallel to the axis of rotation 30A of the tape reel 30 and a second portion 332 extending generally radially inward from the first portion 331. The hub 33 has a central opening 333 therein which facilitates access to the brake assembly 40 by the tape drive mechanism 14 (FIG. 1). A flat metallic washer 34 is provided coaxial with the axis of rotation 30A and is affixed to a radial face of the second portion 332 of the hub 33. Brake teeth 35 are formed on the second portion 332 of the hub 33 opposite the metallic washer 34. To selectively brake and release the tape reel 30, the brake teeth 35 are selectively engaged with and released from brake teeth 46 formed on the release button 42 of the brake assembly 40.

The circular ring of teeth 36 are coaxial with and spaced radially from the metallic washer 34, and the plurality of projections 37 are coaxial with and spaced radially from the circular ring of teeth 36. In one preferred embodiment, the plurality of projections 37 are positioned radially within the inner edge 311 of the flange 31 and radially outside the circular ring of teeth 36. Thus, the plurality of projections 37 are positioned radially between the inner edge 311 and the circular ring of teeth 36. It is, however, within the scope of the present invention for the projections 37 to be positioned radially inside the circular ring of teeth 36. In one preferred embodiment, the circular ring of teeth 36 and each of the projections 37 project from the second portion 332 of the hub 33 in a direction generally parallel to the axis of rotation 30A of the tape reel 30. It is, however, within the scope of the present invention for the circular ring of teeth 36 and/or each of the projections 37 to project from one of the flanges 31 in a direction generally parallel to the axis of rotation 30A of the tape reel 30.

Each tooth of the circular ring of teeth 36 has a tooth height defined between a base 361 and a tip 362 thereof, and each of the projections 37 has an end surface 371. In addition, the circular ring of teeth 36 has a pitch line PL1 defined intermediate the base 361 and the tip 362 of the teeth 36 (see FIG. 9). In one preferred embodiment, the projections 37 do not project beyond the circular ring of teeth 36 such that the end surface 371 is positioned axially between the base 361 and the tip 362 of the teeth 36. Thus, each of the projections 37 terminates between the base 361 and the tip 362 of the teeth 36 (i.e., within the tooth height). In addition, the end surface 371 is oriented generally perpendicular to the axis of rotation 30A of the tape reel 30 and defines an engagement surface or datum plane of the tape reel 30. In one illustrative embodiment, the end surface 371 of each of the projections 37 is offset (or recessed) from the pitch line PL1 of the teeth 36 by a distance in the range of 0.01–0.04 inch; most preferably 0.026 inch. Alternatively, however, other distances are equally acceptable, and each of the projections 37 may extend beyond the pitch line PL1.

Figure 7:
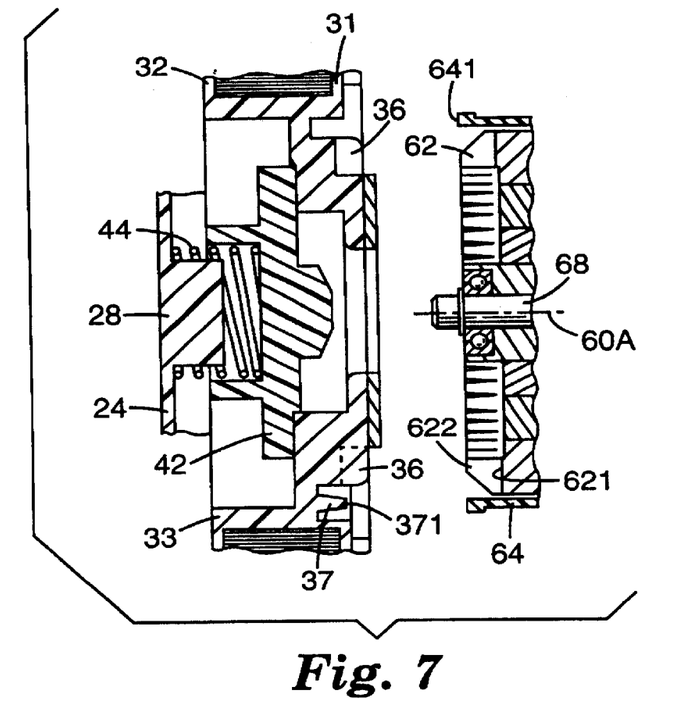
FIG. 7 is a cross-sectional view taken along line 7—7 of FIG. 1 showing portions of the data storage tape cartridge and the tape drive mechanism prior to operative engagement.
Figure 8:
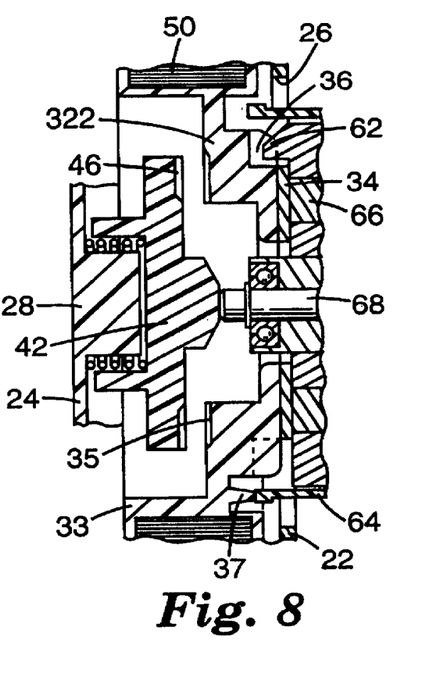
FIG. 8 is a cross-sectional view taken along line 8—8 of FIG. 2 showing portions of the data storage tape cartridge and the tape drive mechanism in operative engagement.

As shown in FIG. 5, one of the flanges 31 is formed integrally with and projects radially outward from the hub 33 at one end thereof. The other flange 32, however, is formed separately from the hub 33. As such, the other flange 32 is secured to and projects radially outward from the hub 33 at an opposite end thereof. It is, however, within the scope of the present invention for the flanges 31, 32 and the hub 33 to all be formed integrally, as shown in FIGS. 7 and 8, and for the flanges 31, 32 and the hub 33 to each be formed separately and then joined together. The circular ring of teeth 36 and each of the projections 37 are also formed integrally with and project axially from the hub 33. It is, however, also within the scope of the present invention for the circular ring of teeth 36 and each of the projections 37 to be formed together as a ring separately from and then joined to the hub 33. In addition, it is also within the scope of the present invention for the circular ring of teeth 36 and/or each of the projections 37 to be formed integrally with one of the flanges 31, and for the circular ring of teeth 36 and each of the projections 37 to be formed together as a ring separately from and then joined to one of the flanges 31. In one preferred embodiment, the circular ring of teeth 36 and each of the projections 37 are formed of 10% glass filled polycarbonate, although other materials known in the art are equally acceptable.

Figure 6A:
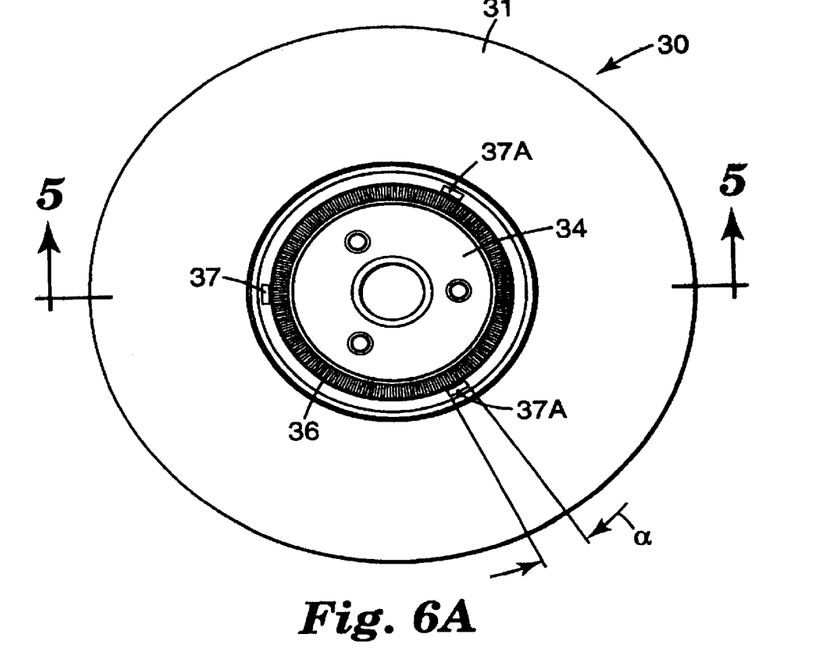
FIG. 6A is a side view of a tape reel of a data storage tape cartridge according to one embodiment of the present invention.
Figure 6B:
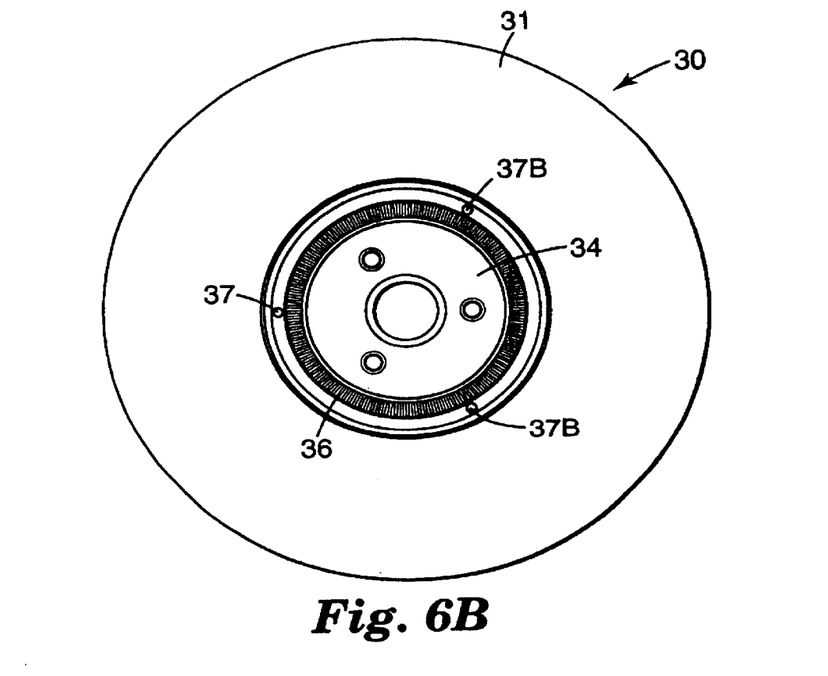
FIG. 6B is a side view of a tape reel of a data storage tape cartridge according to another embodiment of the present invention.

In one preferred embodiment, as shown in FIGS. 6A and 6B, three projections 37 are provided, equidistantly spaced about the axis of rotation 30A of the tape reel 30. Collectively, the projections 37, and in particular the end surface 371 of each of the projections 37, establish a datum plane of the tape reel 30 oriented generally perpendicular to the axis of rotation 30A. FIG. 6A shows one embodiment of the projections 37 wherein the projections 37 are in the form of tabs 37A each having four sides. In one preferred embodiment, each of the tabs 37A has an arcuate shape defined by an included angle alpha. In one illustrative embodiment, the included angle alpha is about 10 degrees. FIG. 6B shows another embodiment of the projections 37 wherein the projections 37 are in the form of cylindrical pins 37B. It is, however, within the scope of the present invention to provide more than three projections 37 equally spaced about the axis of rotation 30A of the tape reel 30.

As shown in FIGS. 1 and 7, the tape drive mechanism 14 generally includes a drive hub 60 and a drive motor 70 for controlling the drive hub 60. The drive hub 60 has an axis of rotation 60A, and includes a plurality of concentrically arranged teeth 62 coaxial with the axis of rotation 60A and a cylindrical ring 64 coaxial with and spaced radially from the circular ring of teeth 62. In one preferred embodiment, the cylindrical ring 64 is positioned radially outside the teeth 62. It is, however, within the scope of the present invention for the cylindrical ring 64 to be positioned radially inside the teeth 62. The teeth 62 and the cylindrical ring 64 project from one end of the drive hub 60 in a direction generally parallel to the axis of rotation 60A. Finally, in one preferred embodiment, the teeth 62 are spring loaded, such that the teeth effectively "float" relative to the cylindrical ring 64.

In a preferred embodiment, three of the teeth 62 are provided, although any other number is equally acceptable. Each of the teeth 62 has a tooth height defined between a base 621 and a tip 622 thereof, and the cylindrical ring 64 has an end surface 641. In addition, the teeth 62 has a pitch line PL2 defined intermediate the base 621 and the tip 622 of the teeth 62 (see FIG. 9). In one preferred embodiment, the cylindrical ring 64 extends beyond the pitch line PL2 such that the end surface 641 is positioned axially beyond the pitch line PL2. In addition, the end surface 641 is oriented generally perpendicular to the axis of rotation 60A of the drive hub 60 and defines an engagement feature of the drive hub 60. As such, the cylindrical ring 64, and in particular the end surface 641 of the cylindrical ring 64, establishes a datum plane of the drive hub 60 oriented generally perpendicular to the axis of rotation 60A. In one illustrative embodiment, an offset (or extension) of the end surface 641 of the cylindrical ring 64 from the pitch line PL2 of the teeth 62 corresponds generally with a recess of the projections 37 from the pitch line PL1 (as previously described), and is in the range of approximately 0.01–0.04 inch; most preferably about 0.026 inch.

The drive hub 60 also includes a magnet 66 at the one end and a shaft 68 that protrudes from the one end. The magnet 66 interacts with (i.e., magnetically attracts and holds) the metallic washer 34 of the tape reel 30, and the shaft 68 interacts with (i.e., contacts and releases) the release button 42 of the brake assembly 40 when the tape cartridge 12 and the tape drive mechanism 14 are operatively engaged (see FIG. 8). In one preferred embodiment, the cylindrical ring 64 is formed of stainless steel, although other rigid materials are equally acceptable.

In use, when the tape cartridge 12 and the tape drive mechanism 14 are operatively engaged, as shown in FIGS. 2 and 8, the magnet 66 magnetically attracts the metallic washer 34, and the shaft 68 contacts and releases the brake assembly 40. In addition, the inner edge 311 of the flange 31 helps guide the cylindrical ring 64 and the projections 37 into contact with each other. As such, the engagement feature of the drive hub 60, defined by the end surface 641 of the cylindrical ring 64, contacts the engagement surface of the tape reel 30, defined by the end surface 371 of the projections 37, and the teeth 62 of the drive hub 60 engage with the teeth 36 of the tape reel 30. Although not clearly shown in FIG. 8, the tape reel 30 and the drive hub 60 are configured such that a slight gap exists between the magnet 66 and the metallic washer 34 upon engagement, such that these components 34, 66 do not interfere with a desired contact between the projections 37 and the cylindrical ring 64. Similarly, due to the preferred spring loaded configuration of the teeth 62 of the drive hub 60, interaction of the teeth 36, 62 will not prevent the cylindrical ring 64 from contacting the projections 37. That is to say, regardless of any tolerance deviations in the teeth 36 and/or 62, the teeth 62 will deflect relative to a remainder of the drive hub 60, via the spring (not shown) associated with the teeth 62, to allow the cylindrical ring 64/projections 37 to dictate a final position of the tape reel 30 relative to the drive hub 60, and thus achieve a desired planar alignment. With the brake assembly 40 released and the teeth 62 of the drive hub 60 engaged with the teeth 36 of the tape reel 30, rotation of the drive hub 60, by the drive motor 70, can rotate the tape reel 30.

In one preferred embodiment, the spring loaded configuration of the teeth 62 allows the teeth 62 to completely mesh within the teeth 36 of the tape reel 30, upon final engagement between the tape reel 30 and the drive hub 60. More particularly, as the drive hub 60 is directed axially toward the tape reel 30, the teeth 62 mesh within the teeth 36. With further axial movement of the drive hub, the teeth 62 remain meshed with the teeth 36, but deflect relative to a remainder of the drive hub 60 so as to allow the cylindrical ring 64 to contact the projections 37. That is to say, relative to the orientation of FIG. 8, following engagement between the teeth 36, 62, the drive hub 60, including the cylindrical ring 64 will continue moving leftward (i.e., toward the tape reel 30), whereas the teeth 62 effectively remain stationary, deflecting relative to the rive hub. Thus, contact between the teeth 36, 62 does not provide an absolute "stop" or otherwise positively position the drive hub 60 relative to the tape reel 30. Instead, because the spring loaded feature of the teeth 62 allows for deflection of the teeth 62 relative to the drive hub 60, a final position of the tape reel 30 relative to the drive hub 60 is dictated solely by an interface between the engagement feature of the drive hub 60 (e.g., the cylindrical ring 64) and the engagement surface of the tape reel 30 (e.g., the projections 37).

Figure 9:
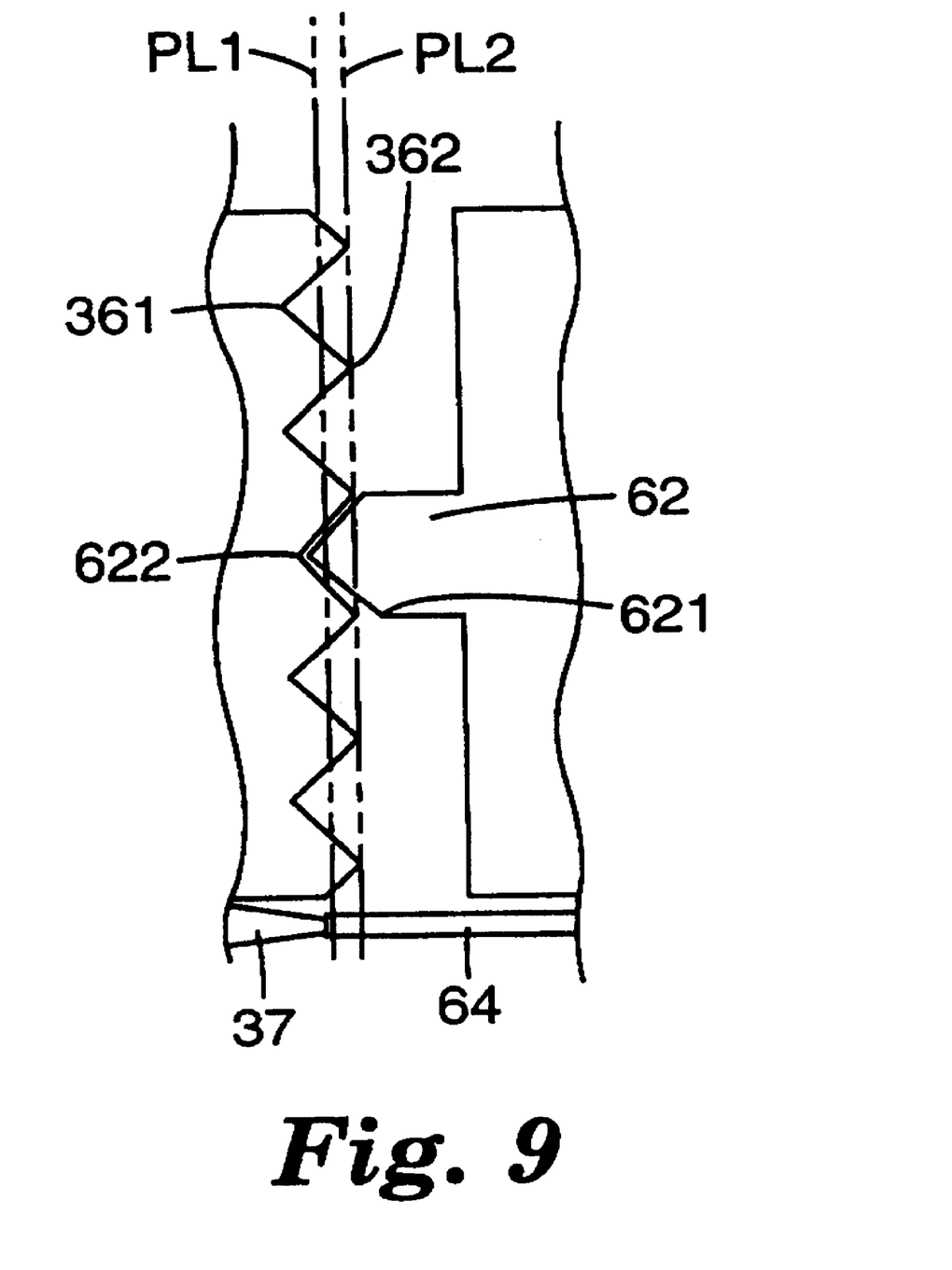
FIG. 9 is a schematic illustration showing portions of a tape reel of a data storage tape cartridge and a drive hub of a tape drive mechanism in operative engagement according to the present invention.

The final, operatively engaged position is best shown in FIG. 9, whereby the teeth 36, 62 are preferably fully meshed, and the cylindrical ring 64 contacts the projections 37. Importantly, by relying upon the engagement surface of the tape reel 30 and the engagement feature of the drive hub 60 to positively position the tape reel 30, unexpected variations or tolerance deviations in the teeth 36 and/or 62 will not negatively affect desired planar positioning of the tape reel 30 relative to the drive hub 60. For example, FIG. 9 depicts the teeth 36 as being non-uniform, such that a final, meshed position of the teeth 36, 62 results in the pitch lines PL1 and PL2 being offset. Without the engagement surface/feature of the present invention, this offset relationship may skew the tape reel 30 relative to the drive hub 60. The present invention overcomes this problem by accurately positioning the tape reel 30/drive hub 60 based upon interface between the projections 37 and the cylindrical ring 62. In this regard, manufacturing tolerances for the cylindrical ring 64 and the projections 37 are more easily controllable than manufacturing tolerances for the teeth 62 and the teeth 36.

In one preferred embodiment, the projections 37 do not project axially beyond the circular ring of teeth 36. It is apparent, however, that the axial height of the projections 37 and the axial height of the cylindrical ring 64 may be varied, albeit in a reciprocal manner, as long as the extent of engagement between the teeth 62 of the drive hub 60 and the teeth 36 of the tape reel 30 remains the same. If, for example, the axial height of the projections 37 is increased by a predetermined amount, then the axial height of the cylindrical ring 64 must be reduced by the same predetermined amount to ensure that the extent of engagement between the teeth 62 of the drive hub 60 and the teeth 36 of the tape reel 30 remains the same.

The engagement surface of the tape reel 30 and the engagement feature of the drive hub 60 accurately and consistently control operative engagement between the data storage tape cartridge 12 and the tape drive mechanism 14. As such, skewing and/or misalignment between the drive hub 60 and the tape reel 30, and, therefore, degraded interaction between the tape drive mechanism 14 and the data storage tape cartridge 12, is avoided. Positioning of the tape reel 30 and, therefore, establishment of the tape path of the storage tape 50, relative to the drive hub 60, is accurately and consistently controlled.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention.

What is claimed is:

1. A tape reel of a data storage tape cartridge, the tape reel having an axis of rotation and comprising:
   a pair of spaced flanges;
   a hub extending between the spaced flanges;
   a circular ring of teeth operatively associated with the spaced flanges and the hub to transmit rotational force thereto, the circular ring of teeth projecting in a direction generally parallel to the axis of rotation; and
   an engagement surface spaced radially from the circular ring of teeth, the engagement surface including a plurality of projections and defining a datum plane of the tape reel.

2. The tape reel of claim 1, wherein the engagement surface is positioned radially outside the circular ring of teeth.

3. The tape reel of claim 1, wherein each of the plurality of projections project in the direction generally parallel to the axis of rotation.

4. The tape reel of claim 3, wherein the plurality of projections establish the datum plane of the tape reel, the datum plane being oriented generally perpendicular to the axis of rotation.

5. The tape reel of claim 1, wherein the plurality of projections are equidistantly spaced from each other.

6. The tape reel of claim 1, wherein the engagement surface is positioned axially between a base and a tip of the teeth.

7. A method of operatively engaging a drive hub of a tape drive mechanism with a tape reel of a data storage tape cartridge, the drive hub and the tape reel each including a circular ring of teeth projecting in a direction generally parallel to an axis of rotation thereof, the method comprising the steps of:
   engaging the teeth of the drive hub with the teeth of the tape reel;
   contacting an engagement surface of the tape reel with an engagement feature of the drive hub, including contacting a plurality of projections of the tape reel with the engagement feature of the drive hub; and
   preventing a tip of the teeth of the drive hub from contacting a base of the teeth of the tape reel by contact of the engagement surface with the engagement feature.

8. A data storage tape cartridge, comprising:
   a housing;
   at least one tape reel rotatably disposed within the housing, the tape reel having an axis of rotation and including:
      a pair of spaced flanges,
      a hub extending between the spaced flanges,
      a circular ring of teeth operatively associated with the spaced flanges and the hub to transmit rotational force thereto, the circular ring of teeth projecting in a direction generally parallel to the axis of rotation,
      an engagement surface spaced radially from the circular ring of teeth, the engagement surface defining a datum plane of the tape reel, and
      a plurality of projections spaced radially from the circular ring of teeth and projecting in the direction generally parallel to the axis of rotation, each of the projections having a surface constituting a portion of the engagement surface; and
   storage tape maintained by the at least one tape reel.

9. The data storage tape cartridge of claim 8, wherein the hub includes a first portion extending between the spaced flanges and a second portion extending radially inward from the first portion, wherein the circular ring of teeth and each of the plurality of projections project from the second portion of the hub in the direction generally parallel to the axis of rotation, and wherein the plurality of projections are positioned radially outside the circular ring of teeth.

10. The data storage tape cartridge of claim 8, wherein the plurality of projections establish the datum plane of the tape reel, the datum plane being oriented generally perpendicular to the axis of rotation.

11. The data storage tape cartridge of claim 8, wherein each of the plurality of projections terminates axially between a base and a tip of the teeth.

12. The data storage tape cartridge of claim 8, wherein the plurality of projections are equidistantly spaced from each other.

13. A data storage tape drive system, comprising:
   a data storage tape cartridge, the data storage tape cartridge comprising:
      a housing,
      a tape reel rotatably disposed within the housing, the tape reel including a circular ring of teeth projecting in a direction generally parallel to an axis of rotation of the tape reel and an engagement surface spaced radially from the circular ring of teeth, the engagement surface including a plurality of projections projecting in the direction generally parallel to the axis of rotation of the tape reel, and
      storage tape maintained by the tape reel; and
   a tape drive mechanism selectively engaged with the data storage tape cartridge, the tape drive mechanism comprising:
      a drive hub including a circular ring of teeth projecting in a direction generally parallel to an axis of rotation of the drive hub and an engagement feature spaced radially from the circular ring of teeth of the drive hub,
   wherein the engagement feature of the drive hub is engaged with the engagement surface of the tape reel when the drive hub is operatively engaged with the tape reel to establish a datum plane of the tape reel relative to the drive hub.

14. The data storage tape drive system of claim 13, wherein the engagement surface of the tape reel is oriented generally perpendicular to the axis of rotation of the tape reel, and wherein the engagement feature of the drive hub includes a surface which is oriented generally perpendicular to the axis of rotation of the drive hub.

15. The data storage tape drive system of claim 13, wherein the teeth of the drive hub are engaged with the teeth of the tape reel when the dive hub is operatively engaged with the tape reel.

16. The data storage tape drive system of claim 13, wherein the engagement feature of the drive hub comprises a cylindrical ring projecting in the direction generally parallel to the axis of rotation of the drive hub.

17. The data storage tape drive system of claim 16, wherein each of the plurality of projections terminates axially between a base and a tip of the teeth of the tape reel, and wherein the cylindrical ring extends axially beyond a tip of the teeth of the drive hub.

18. The data storage tape drive system of claim 13, wherein the plurality of projections are equidistantly spaced from each other.

* * * * *